F. A. JOHANKNECHT.
MOTOR VEHICLE.
APPLICATION FILED JAN. 5, 1920.
1,403,249.
Patented Jan. 10, 1922.
3 SHEETS—SHEET 1.
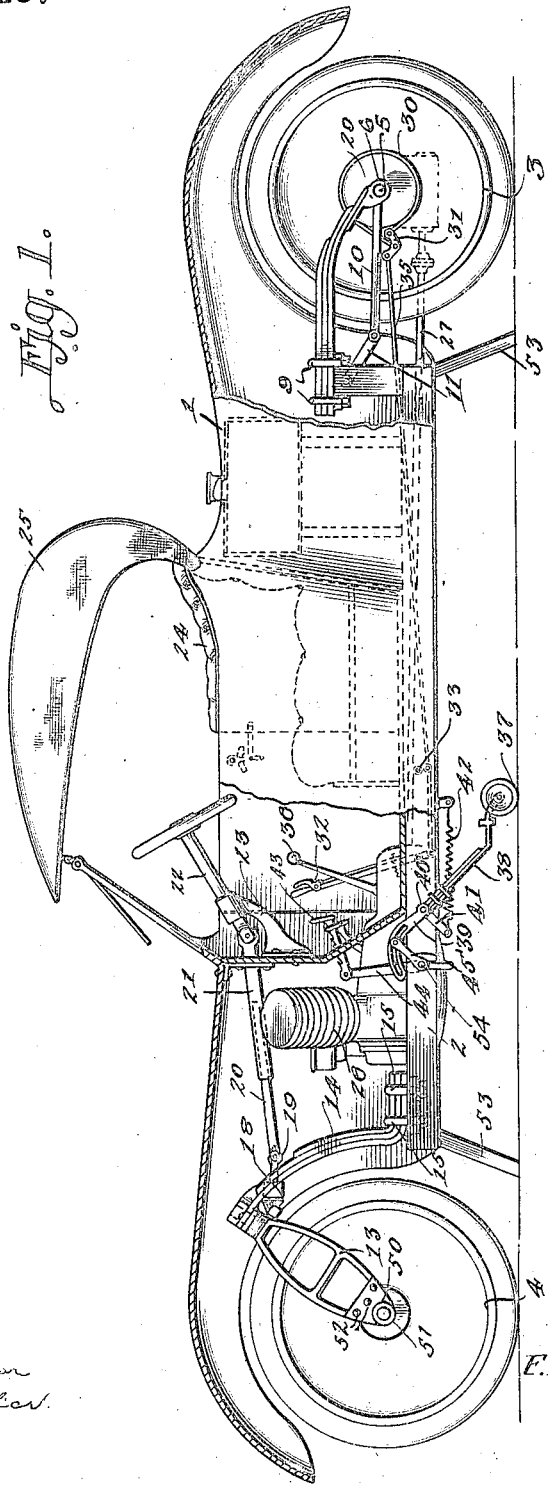
WITNESSES
INVENTOR
F. A. JOHANKNECHT,
BY
ATTORNEYS F. A. JOHANKNECHT.
MOTOR VEHICLE.
APPLICATION FILED JAN. 5, 1920.
1,403,249.
Patented Jan. 10, 1922.
3 SHEETS—SHEET 2.
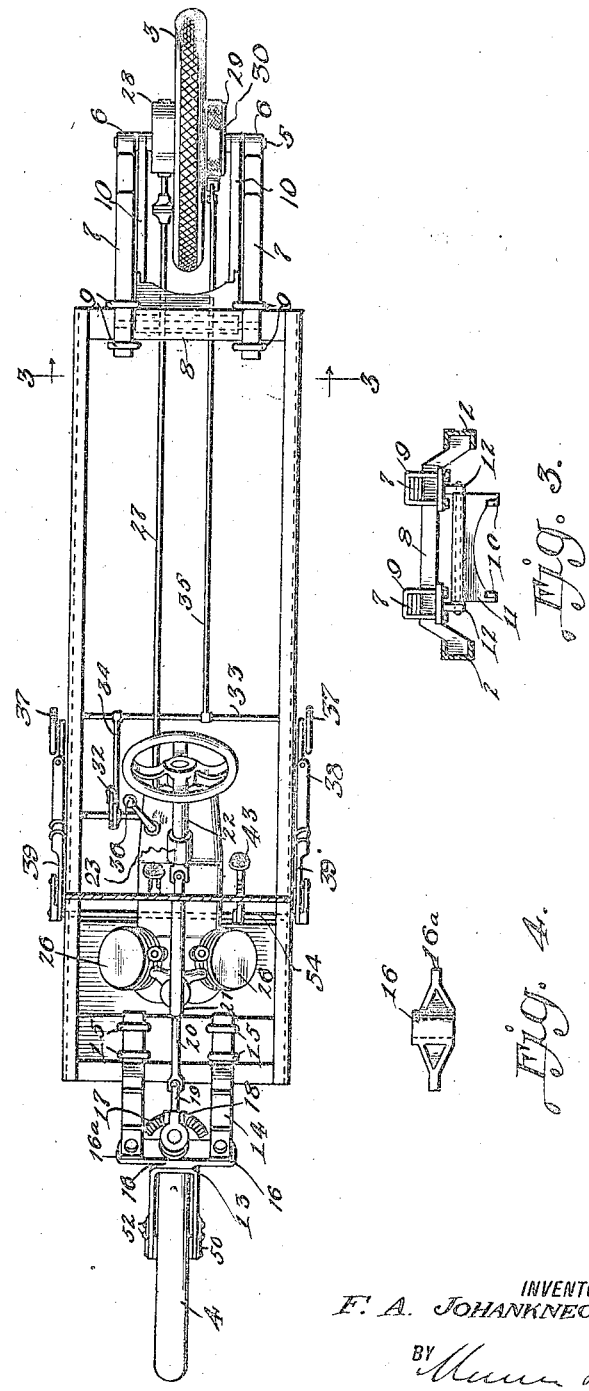
WITNESSES
INVENTOR
F. A. JOHANKNECHT,
BY
ATTORNEYS

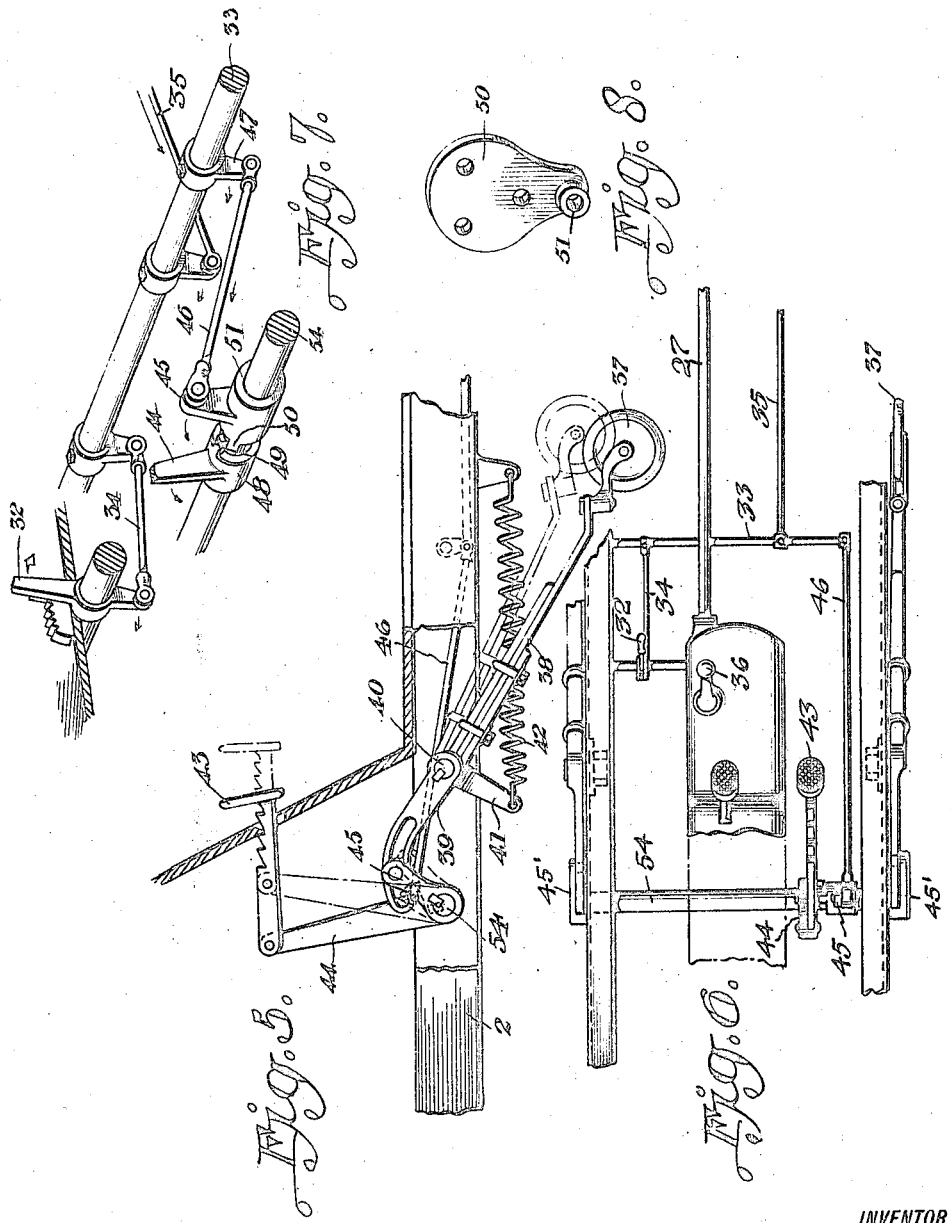

UNITED STATES PATENT OFFICE.

FREDERICK AUGUSTUS JOHANKNECHT, OF BIRMINGHAM, ALABAMA.

MOTOR VEHICLE.

1,403,249.           Specification of Letters Patent.   Patented Jan. 10, 1922.

Application filed January 5, 1920. Serial No. 349,464.

*To all whom it may concern:*

Be it known that I, FREDERICK A. JOHANKNECHT, a citizen of the United States, and a resident of Birmingham, in the county of Jefferson and State of Alabama, have invented certain new and useful Improvements in Motor Vehicles, of which the following is a specification.

My invention is an improvement in motor vehicles, and has for its object to provide a vehicle of the character specified, wherein the body is supported by two wheels, one of which is the guiding wheel and the other the tractor wheel, and wherein means is provided for supporting the body when at rest.

In the drawings:

Figure 1 is a side view of the improved vehicle with parts in section.

Figure 2 is a top plan view.

Figure 3 is a section on the line 3—3 of Figure 2.

Figure 4 is a front view of the head.

Figure 5 is a sectional detail showing the mechanism for lowering the supporting wheels.

Figure 6 is a plan view of Figure 5.

Figure 7 is a perspective view showing a detail of the connection between said mechanism and the brake.

Figure 8 is a perspective view showing the detachable connection of the front axle.

In the present embodiment of the invention, a body 1 is provided which is connected to a frame 2, the said frame consisting of the usual parallel laterally spaced channel bars, which are connected by cross plates at the ends, the said frame being substantially rectangular in outline. A rear wheel 3 and a front wheel 4 are provided, the rear wheel being journaled to an axle 5 which is journaled in bearings 6 at the rear ends of laminated springs 7 which at their front ends are held to an upwardly offset cross bar 8 at the rear of the frame, by means of U-shaped clips 9.

These clips as shown more particularly in Figure 2, are arranged on opposite sides of the cross bar, a pair being provided for each spring. Torsion rods 10 are secured at their rear ends on the axle inside the bearings 6, and these rods are connected at their front ends to a compound shackle bar 11 which in turn is pivoted between lugs 12 depending from the cross bar.

The front wheel 4 is connected to the frame by a fork 13, and laminated springs 14, the springs being held to the front cross bar of the frame by clips 15, and being connected at their forward ends to laterally extending arms 16ª on a head 16 carried by the front fork 13. A gear segment 17 is carried by the fork, with which meshes a bevel gear 18 on a stub shaft 19 which is connected to the inner section of a telescoping shaft 20—21 by a universal joint connection.

The telescoping shaft sections are slidably connected, but are constrained to turn together in any suitable manner, and the rear end of the telescoping shaft is connected to the steering shaft 22 by a universal joint. This shaft 22 has the usual wheel, and it is journaled in a bracket 23 secured to the dashboard. The seat 24 is just in rear of the wheel, and a top 25 is provided above and in rear of the seat.

The motor 26 of any usual or desired construction is connected by a transmission shaft 27 with the rear wheel through a worm gear connection 28. A brake disk 29 is arranged on the rear wheel, and this disk is encircled by a band 30. The band which operates in the usual manner, having its ends connected to a lever 31 to be operated when the lever is swung, is controlled by a lever 32 arranged in front of the seat, and having latch mechanism for holding it as shown, in adjusted position.

A shaft 33 is journaled transversely of the frame in front of the seat, and this shaft has depending arms which are connected by links 34 and 35 respectively with the lever 32, and with the lever 31. The transmission is controlled by a lever 36 beneath the steering wheel.

Mechanism is provided for supporting the vehicle in upright position when at rest. This mechanism consists of a pair of wheels 37. Each wheel is journaled on the lower end of a laminated spring 38, whose upper end is rigid with an arc shaped bar 39 having a slot. The combined spring and bar constituting a lever is pivoted at 40 to the frame, and at the pivotal connection the lever has an arm 41 which is connected by a spring 42 with the frame, the spring acting normally to swing the wheels into inoperative position.

The wheels are moved into operative position by means of a pedal 43. This pedal is slidable through the dash board, and is connected at its forward end to the upper end of a lever 44 having an arm 45' slidably connected with the bar 39, by means of a pin engaging the slot. The pedal as shown has teeth for engaging the edge of the slot through the dash board to hold the pedal in adjusted position, that is, with the wheels 37 in engagement with the ground.

The shaft 54 on which the lever 44 is secured has a radial arm 45 journaled thereon, which is connected by a link 46 with a depending arm 47 on the shaft 33 before mentioned. The hub 48 of the lever 44 has a catch or projection 49 which is adapted to engage a catch 50 on the hub 51 of the radial arm 45, to operate said arm, to cause the arm to operate the brake through the connection 46—47 and the shaft 33.

In operation, when the car is at rest, the pedal is pushed forward and held in adjusted position by the engagement of the teeth with the edge of the slot through the dash board. In starting the car, the engine is started in the usual manner, and when running is clutched to the rear wheel in the usual manner. As soon as the car starts, the wheels 37 are released and the springs return them to inoperative position.

In stopping the car, the wheels must be dropped before the brake is applied. When the pedal 43 is pushed forwardly to apply the brake, the pin of the arm 45 moves to the forward end of the slot in the lever 38—39, and operates the said lever to lower the wheels. Near the end of its movement, the catches 49—50 engage, and the brake is applied.

Means is provided for disconnecting the front wheel. The said means consists of bracket plates 50 which are bolted to the fork arms, and these plates have bearings 51 for the ends of the front axle. By releasing the bolts 52 which connect the plates to the fork arms, it will be evident that the wheel and the axle may be detached from the front of the frame. Four legs 53 are provided for supporting the frame when repairing and the like, the four legs being used for jacking up the frame.

I claim:

1. A vehicle, comprising a frame, a shaft carried thereby, a prop having connection with said shaft, an operating member arranged on said shaft and having a laterally projecting lug, a sleeve on said shaft and having a lug arranged in the path of travel of the said first named lug, and a brake connected to said sleeve.

2. The combination with a shaft having an operating member provided with a lug, of a wheeled prop connected to said shaft, an arm having a hub mounted on said shaft and provided with a lug in the path of travel of said first named lug, and brake operating means connected to said arm.

3. The combination with a shaft having an operating member provided with a lug, of a wheeled prop connected to said shaft, an arm having a hub mounted on said shaft and provided with a lug in the path of travel of said first named lug, brake operating means connected to said arm, and a spring urging said prop to its inoperative position.

4. A vehicle comprising a frame, a prop pivoted intermediate its ends to the frame and including a lower laminated spring portion and an upper longitudinally curved portion, a transversely extending shaft carried by said frame and having a crank provided with a pin slidably connected to the longitudinally curved portion of said prop, a foot pedal having connection with said shaft, and a brake operated by said shaft.

5. A vehicle comprising a frame, a prop pivoted intermediate its ends to the frame and including a lower laminated spring portion and an upper longitudinally curved portion, a transversely extending shaft carried by said frame and having a crank provided with a pin slidably connected to the longitudinally curved portion of said prop, a foot pedal having connection with said shaft, a brake operated by said shaft, and spring means urging said prop to its inoperative position, the laminated spring portion of said prop being provided with a wheel.

FREDERICK AUGUSTUS JOHANKNECHT.